United States Patent [19]

Nousiainen et al.

[11] Patent Number: 5,754,560
[45] Date of Patent: May 19, 1998

[54] METHOD AND APPARATUS FOR ESTABLISHING A TEST LOOP FOR MONITORING THE OPERATION OF A RADIO STATION

[75] Inventors: Seppo Nousiainen, Oulu; Ismo Pudas, Martinniemi, both of Finland

[73] Assignee: Nokia Telecommunications Oy, Espoo, Finland

[21] Appl. No.: 776,941

[22] PCT Filed: Jun. 11, 1996

[86] PCT No.: PCT/FI96/00347

§ 371 Date: Feb. 14, 1997

§ 102(e) Date: Feb. 14, 1997

[87] PCT Pub. No.: WO97/00586

PCT Pub. Date: Jan. 3, 1997

[30] Foreign Application Priority Data

Jun. 16, 1995 [FI] Finland ............... 953011

[51] Int. Cl.[6] .............. G01R 31/28; H03C 1/62; H04B 17/00
[52] U.S. Cl. .......... 371/70.5; 370/248; 370/249; 455/115; 455/226.1; 455/67.4
[58] Field of Search .................. 371/20.5, 20.6, 371/68.2; 370/248, 249; 455/67.1, 67.4, 89, 115, 129, 226.1

[56] References Cited

FOREIGN PATENT DOCUMENTS 0531345  11/1995  European Pat. Off. .
2149256   6/1985  United Kingdom .

*Primary Examiner*—Hoa T. Nguyen
*Attorney, Agent, or Firm*—IP Group of Pillsbury Madison & Sutro LLP

[57] ABSTRACT

The invention provides advantageous and reliable loop equipment (60) for establishing a test loop for monitoring the condition of a radio station including at least two antennas. The loop equipment (60) comprises input ports (61, 61'), output ports (69, 69') and a controllable selector switch (62) wherewith the signal of one input port (61') is selected to at least one output port (69, 69'). The loop epuipment is so adapted that its input ports (61, 61') are connected to the outputs of tansmitters (TX, TX') and output ports (69, 69') to the input of a receiver (RX, RX'). Various test loops for monitoring the condition of transmitters, receivers and antennas at a radio station can be established by means of the loop equipment.

9 Claims, 3 Drawing Sheets

METHOD AND APPARATUS FOR ESTABLISHING A TEST LOOP FOR MONITORING THE OPERATION OF A RADIO STATION

This application is the national phase of international application PCT/FI96/00347, filed Jun. 11, 1996 which designated the U.S.

The present invention relates to the monitoring of radio transceivers, in particular at base stations of mobile communications systems.

FIGS. 1 and 2 show a prior art solution for connecting test apparatus with a base station. The base station 1, which has connection with a base station controller 2, comprises at least the following functional blocks: operation and maintenance 3, a frame unit 4, a transceiver unit 5, a combiner 6 and a receiving, multicoupler 7.

The essential part from the point of view of the invention is the test apparatus 8, which is used to measure the condition of the base station. In FIG. 1, the test apparatus 8 is connected with cables to combiner 6 and receiving multicoupler 7. FIG. 2 shows an arrangement in which the test apparatus 8 is provided with a dedicated antenna and is thus not connected with cables to transmitting and receiving branches, but measures the air interface.

Drawbacks of separate test apparatus include the large number of connections, which impairs the reliability and measuring accuracy and adds to the cost of the system. Furthermore, the prior art approaches are not versatile, i.e. the test signal is either directly connected, as in FIG. 1, or passes through antennas as in FIG. 2. However, with the known approaches one cannot variably select both directly coupled signals and signals transmitted via antennas for measurement.

In connection with TDMA mobile communications systems, such as the GSM and DCS1800 systems, separate test apparatus simulates the passing of the signal from the base station to the mobile station and back. For this reason, it has a delay loop installed therein, which will delay the passage of the signal by three TDMA time slots. On account of this delay loop, for instance, the prior art test apparatus is expensive and complex.

The invention relates to test apparatus, to its installation at a base station and to a method of use with which the problems with the prior art are solved and an inexpensive yet versatile and reliable approach is provided for monitoring the operation of a transceiver unit and antennas.

The object of the invention is achieved in such a way that the test apparatus is integrated into the transceiver, and hence it has access to the internal signals within the transceiver and also to external signals arriving via antennas.

The invention will be explained in greater detail in the following by means of figures in which FIG. 1 shows a prior art arrangement in which test signals are connected directly to the test apparatus, FIG. 2 shows a prior art arrangement in which test signals are connected through antennas to the test apparatus, FIG. 3 shows the connection of test apparatus with a transceiver unit in accordance with the invention, FIG. 4 is a detailed block diagram of the test apparatus of the invention, and FIGS. 5 and 6 are extensions of FIG. 4 in cases where there are more than two receiving branches.

The arrangement for the test apparatus in accordance with the invention is shown in FIG. 3. The invention will be explained in the context of a base station for a mobile communications system furnished with downlink and uplink diversity properties, but it is obvious that the invention is applicable to transceiver units of other types as well. The transceiver functions of the base station shown in FIG. 3 are duplicated. Redundancy of the system enables downlink and uplink diversity to be achieved. It is possibly attempted at some base stations to improve the diversity properties by installing more than two receiving branches in the base station. To start with, it will be assumed for clarity that there are two transmission branches and two receiving branches. The alterations required by more than two receiving branches will be explained hereinbelow in connection with FIGS. 5 and 6.

In the downlink direction, the signal travel path includes a transmitter TX (not shown), an isolator 10, a directional coupler 22, a transmission branch TXF of a duplex filter 40 and an antenna 50. The corresponding parts of a diversity transmitter are indicated with apostrophes.

In the uplink direction, the signal travel path includes an antenna 50, a receiving branch RXF of the duplex filter 40 and a receiver RX (not shown). The corresponding parts of a diversity receiver are also indicated with apostrophes. The antennas 50 and 50' serve as transmitting and receiving antennas.

In this example, the isolator (directional attenuator) 10 adapts the output port of the transmitter in such a way that the transmitter signal TX passes through the isolator 10 in the direction of the antenna 50, but the returned signal is connected to the resistor between the isolator 10 and earth. The adaptation may also be implemented by other means than with an isolator.

The directional coupler 22 samples the propagating and the reflected radio-frequency signal. The samples are combined in an adder 32 and coupled to a selector switch 62 of the test apparatus 60.

A detailed block diagram of the test apparatus 60 is illustrated in FIG. 4. The test apparatus 60 comprises at least input ports (61, 61'), a first controllable selector switch 62, a divider means 68, output ports (69, 69'), a local oscillator 64 and a mixing unit 66. The frequency of the local oscillator is equal to the duplex frequency of the system, i.e. the difference between the transmission and receiving frequencies, for example 45 MHz with the GSM. The control of the selector switch 62 is provided by the base station in accordance with Table 1 below.

In the GSM system, the control of the local oscillator 64 is provided simply by an enabling signal with which the frequency of the oscillator 64 is the above-stated 45 MHz. When the invention is used in a system in which the duplex frequency changes, also the control of the local oscillator must be changed accordingly.

In a preferred embodiment of the invention, divider means 68 is a symmetrical power divider, e.g. a Wilkinson divider. In such a case, the selection of the first selector switch influences both output ports 69, 69' simultaneously. Also a second controllable selector switch may be employed as divider means 68. In that case, the test signal influences only one output port 69 or 69' at a time.

With the arrangement of the invention, test loops in accordance with Table 1 are obtained.

TABLE 1

| Test | Transmission | Reception | Position of switch | Test loop |
|---|---|---|---|---|
| 1 | TX | RX' | 61 | Internal |
| 2 | TX' | RX | 61' | Internal |

TABLE 1-continued

| Test | Transmission | Reception | Position of switch | Test loop |
|---|---|---|---|---|
| 3 | TX | RX' | 61' | Through antennas |
| 4 | TX' | RX | 61 | Through antennas |
| 5 | TX | RX | 61 | Internal |
| 6 | TX' | RX' | 61' | Internal |

The signal paths corresponding to tests 1–6 in Table 1 are in accordance with Table 2 below, using the reference numerals and characters of FIG. 3.

TABLE 2

Test 1: TX-10-22-32-61-69'-RX'
Test 3: TX-10-40-50-50'-TXF'-22'-32'-61'-69'-RX'
Test 5: TX-10-22-32-61-69-RX The tests with even numbers 2, 4, 6 correspond to the tests with odd numbers 1, 3 and 5, the apostrophized references being replaced with references without apostrophes, and vice versa.

FIGS. 5 and 6 show solutions incorporating more than two receivers. FIGS. 5 and 6 only show the changes as opposed to FIG. 4. In the circuit of FIG. 5, there are three receivers, of which RX is the actual receiver and RX' and RX" are diversity receivers. The output of power divider 68 is further split with two dividers 68a and 68b. The outputs of divider 68a are applied to receivers RX and RX'. The first output of divider 68b is applied to receiver RX", and its second output terminates with a resistor having an impedance equal to the input impedance of the receivers RX . . . Divider 68b may seem superfluous, but this allows the input signals of all receivers RX . . . to pass through an equal number of divider stages and hence to attenuate with the same coefficient.

In the circuit shown in FIG. 6, divider means 68 is a second controllable switch. In this circuit, the signal received via the test loop influences only one receiver at a time, thus avoiding any possibly dissimilar signal attenuation produced by the dividers. The drawback is naturally that a control signal must be provided to the output switch 68. The control signals in accordance with Table 1 and the paths in accordance with Table 2 are also applicable to the circuit of FIG. 6. In that case, instead of diversity receiver RX', the diversity receiver whose condition one desires to monitor in each case, i.e. RX', RX" etc., must be used. Output switch 68 must naturally be directed to a position corresponding to the particular receiver employed in the testing.

Since the arrangement in accordance with the invention allows several different test loops to be selected, it may be used to test all transmitters, receivers and antennas at a radio station. If, for example, the test signal passes from a transmitter to a receiver within a unit, but not through antennas, the fault can be located to lie with the antennas or their connections.

The invention now disclosed is equally well suitable for on-line tests performed during the operation of a base station and for commissioning tests.

The solution in accordance with the invention is simple for instance for the reason that it does not include the delay component of three time slots in accordance with the TDMA system. This does involve the slight drawback that when the test apparatus is used, the transmission capacity of the system is loaded slightly more than in the prior art arrangement, since two time slots must be assigned for the test apparatus of the invention. However, this drawback is only nominal, as the test apparatus is not used all the time, but mainly in the commissioning of a base station, at preselected intervals during use, and in problem situations.

A further advantage of the test apparatus of the invention is that it is also well suitable for measurements performed at base stations having "intelligent" antennas. The directional pattern of "intelligent" antennas may be changed electrically, e.g. in such a manner that for the duration of the testing the beams of the antennas are turned slightly to face one another. Since the apparatus of the invention can be used to test both the internal routes within a base station and the routes through the antennas, changes in the properties of the antennas can be readily measured.

The above is a description of an embodiment of the invention in a mobile communications system base station having downlink and uplink diversity properties. It is obvious that the invention can be applied to any radio station having at least two antennas. If only one transmitter and one receiver is provided, the invention can still be applied to monitoring an internal test loop within the unit.

We claim:

1. A method for establishing a test loop for monitoring the condition of transmitters, receivers and antennas at a radio station, the radio station including at least two antennas (50, 50') and loop equipment (60) having at least two input ports, characterized by comprising the steps of generating a transmission signal with at least one transmitter (TX, TX');

providing the transmission signal to a first input port (61) of the loop equipment (60) prior to applying the transmission signal to a first antenna (50);

providing the transmission signal received through a second antenna (50') to a second input port (61') of the loop equipment (60);

selecting with a controllable selector switch (62) a signal corresponding to the desired input ports (61, 61') for the output of the selector switch (62);

converting the frequency of the output signal of the selector switch into the receiving frequency; and providing the signal converted into the receiving frequency to at least one receiver.

2. A method as claimed in claim 1, wherein the radio station comprises at least two transmitters and at least two receivers, characterized in that a signal influenced by both the signal transmitted with the first antenna (50) and the signal received by that antenna is provided to the first input port (61) of the loop equipment, and a signal influenced by both the signal transmitted with the second antenna (50') and the signal received by that antenna is provided to the second input port (61') of the loop equipment.

3. A method as claimed in claim 1, wherein the radio station is a base station of a mobile communications system employing the TDMA time division method, characterized by further comprising the step of allocating a first time slot for the transmitter and a second time slot simultaneous with the transmission time slot for the receiver.

4. Loop equipment (60) for establishing a test loop for monitoring the condition of transmitters, receivers and antennas at a radio station, the radio station including at least two antennas (50, 50'), characterized in that the equipment (60) comprises a first and a second input port (61, 61') and a first and a second output port (69, 69');

a first selector switch (62) responsive to external control for selectively switching the signal of the first input port (61) or the second input port (61') to the output of the selector switch (62);

a divider means (68) for operably coupling the output of the first selector switch (62) to at least one of the output ports (69, 69');

and that the loop equipment (60) is further so adapted that the first input port (61) and the second input port (61') are operably coupled to the output of a first transmitter (TX) and of a second transmitter (TX') respectively; and that the first output port (69) and the second output port (69') are operably coupled to the input of a first receiver (RX) and of a second receiver (RX') respectively.

5. Equipment as claimed in claim 4, characterized in that the divider means (68) is a power divider, the output of the first selector switch (62) influencing all output ports (69, 69').

6. Equipment as claimed in claim 4, characterized in that the divider means (68) is a second selector switch responsive to external control, the output of the first selector switch (62) influencing only one output port (69, 69') at a time.

7. Equipment as claimed in claim 4, characterized in that the input ports (61, 61') of the loop equipment (60) are connected to adder means (32, 32'), signals transmitted with the antennas (50, 50') and signals received by the antennas both influencing the input ports (61, 61').

8. Equipment as claimed in any one of claims 4–7, characterized in that the loop equipment (60) further comprises a mixing unit (66) operably coupled to the output of the first selector switch (62) and a local oscillator (64) connected to the mixing unit for converting the signal from transmission frequency into receiving frequency.

9. Equipment as claimed in any one of claims 4–8, characterized in that said first transmitter (TX) and first receiver (RX) constitute the actual transceiver unit of the base station, and said second transmitters (TX', TX" . . . ) and second receivers (RX', RX" . . . ) constitute diversity transceiver units of the base station.

\* \* \* \* \*

UNITED STATES PATENT AND TRADEMARK OFFICE
CERTIFICATE OF CORRECTION

PATENT NO. : 5,754,560  
DATED : May 19, 1998  
INVENTOR(S) : NOUSIAINEN et al.

Page 1 of 4

It is certified that error appears in the above-identified patent and that said Letters Patent is hereby corrected as shown below:

Column 1, before line 9, insert --BACKGROUND OF THE INVENTION--;
before line 43, insert --SUMMARY OF THE INVENTION--; and
before line 64, insert --DETAILED DESCRIPTION--.

Column 4, line 22, delete "(50,";
line 23, delete "50'); and delete "(60)";
line 24, delete "characterized by"; and after "of" insert ---:--;
line 25, before "generating" insert --(a)--;
line 26, delete "(TX,TX')";
line 27, before "providing" insert --(b)--; and delete "(61)";
line 28, delete "(60)";
line 29, delete "(50)";
line 30, before "providing" insert --(c)--;
line 31, delete "(50')"; and delete "(61')";
line 32, delete "(60)";
line 33, before "selecting" insert --(d)--; and delete "(62)";
line 34, delete "(61,61')";
line 35, delete "(62)";
line 36, before "converting" insert --(e)--;
line 39, before "providing" insert --(f)--;
line 41, delete "A" and insert --The--; and delete "wherein" and insert --in which--;
line 42, delete "comprises" and insert --includes--;
line 43, delete "characterized in that" and insert --wherein:--; and before "a signal" start a new paragraph and insert --in step (b),--;
line 44, delete "(50)";
line 46, delete "(61)"; and after "equipment" delete "," and insert --;--; and before "a signal" start a new paragraph and insert --in step (c),--;

UNITED STATES PATENT AND TRADEMARK OFFICE
CERTIFICATE OF CORRECTION

PATENT NO. : 5,754,560

DATED : May 19, 1998

INVENTOR(S) : NOUSIAINEN et al.

It is certified that error appears in the above-identified patent and that said Letters Patent is hereby corrected as shown below:

Column 4, line 47, delete "(50)";
line 49, delete "(61)";
line 50, delete "A" and insert --The--; delete "wherein" and insert --in which--;
lines 52-53, delete "characterized by" and after "of" insert --:--;
line 57, delete "(60)";
line 60, delete "(50,50')"; and delete "characterized in that the" and insert --said--;
line 61, delete "(60) comprises" and insert --comprising:--;
line 62, delete "61,61')";
line 63, delete "(69,69')";
line 64, delete "(62)";
line 66, delete "(61)"; and delete "(61')"; and
line 67, delete "(62)".

Column 5, line 1, delete "(68)";
line 2, delete "(62)";
line 3, delete "(69,69')";
line 4, delete "and that the loop equipment (60) is further so adapted that";
line 5, delete "(61')";
line 6, delete "are" and insert --being--;
line 7, delete "(TX)"; and delete "(TX')" and insert --,--;
line 8, delete "that"; and delete "(69)";
line 9, delete "(69') are" and insert --being--;
line 10, delete "(RX)"; and delete "(RX')" and insert --,--;
line 12, delete "Equipment" and insert --The equipment--; and delete "characterized in that" and insert --wherein:--;
line 13, delete "(68)";
line 14, delete "(62)"; and delete "(69,";

UNITED STATES PATENT AND TRADEMARK OFFICE
CERTIFICATE OF CORRECTION

PATENT NO. : 5,754,560  
DATED : May 19, 1998  
INVENTOR(S) : NOUSIAINEN et al.

Page 3 of 4

It is certified that error appears in the above-identified patent and that said Letters Patent is hereby corrected as shown below:

Column 5, line 15, delete "69')";
    line 16, delete "Equipment" and insert –The equipment--; and delete "characterized in that" and insert --wherein:--;
    line 17, delete "(68)";
    line 18, delete "(62)";
    line 19, after "one" insert --of said--; and delete "port (69,69')" and insert --ports--;

Column 6, line 1, delete "Equipment" and insert --The equipment--; and delete "characterized in that" and insert --wherein:--; after "in that" start a new paragraph;
    line 2, delete "(61,61')"; and delete "(60)";
    line 3, delete "(32,32')";
    line 4, delete "(50,50')";
    line 5, delete "(61,61')";
    line 6, delete "Equipment" and insert --The equipment--;
    line 7, delete "characterized in that" and insert --wherein:--; and delete "(60)";
    line 8, delete "(66)";
    line 9, delete "(62)"; and delete "(64)";
    line 12, delete "Equipment" and insert --The equipment--;
    line 13, delete "characterized in that" and insert --wherein:--; after "in that" start a new paragraph; and delete "(TX)";
    line 14, delete "(RX)"; and delete "the actual" and insert --a--; and delete second occurrence "the" and insert --a--;
    line 15, delete "transmitters (TX',TX" ...)" and insert --transmitter--;
    line 16, delete "receivers (RX',RX" ...)" and insert --receiver--; and after "constitute" insert --a--;
    line 17, delete "units" and insert --unit--; and delete "the" and insert --said--.

UNITED STATES PATENT AND TRADEMARK OFFICE
CERTIFICATE OF CORRECTION

PATENT NO. : 5,754,560
DATED : May 19, 1998
INVENTOR(S) : NOUSIAINEN et al.

It is certified that error appears in the above-identified patent and that said Letters Patent is hereby corrected as shown below:

Abstract page, replace the entire text of the Abstract with the ABSTRACT OF DISCLOSURE, as follows:

--ABSTRACT OF THE DISCLOSURE

In loop equipment for establishing a test loop for monitoring the condition of transmitters, receivers (e.g. base station transceivers) and antennas at a radio station which includes two antennas, first and second input ports and output ports are provided. A first selector switch is responsive to external control for selectively switching the first or second input ports to the output of the selector switch to at least one of the output ports. The first and second input ports are respectively coupled to the inputs of a first and second receiver. The test equipment, by being integrated into base station transceivers has access to internal signals within the transceivers, and also to external signals arriving via antennas.--

Signed and Sealed this

Second Day of May, 2000

*Attest:*

Q. TODD DICKINSON

Figure 1:
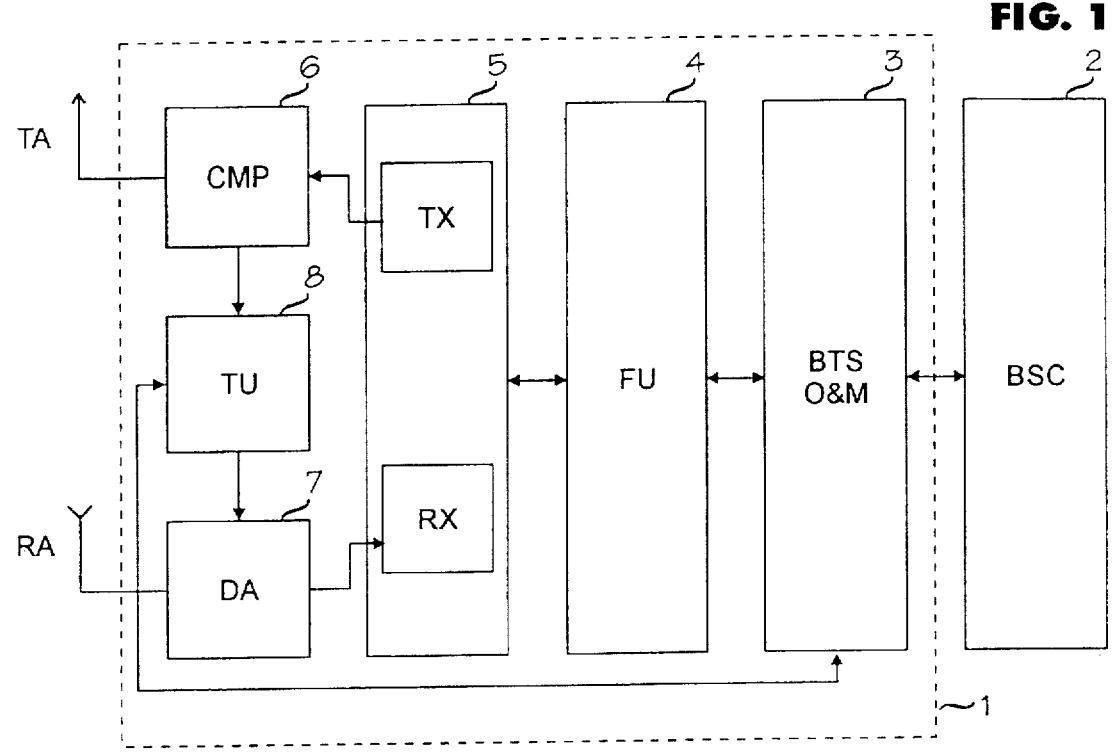
Figure 2:
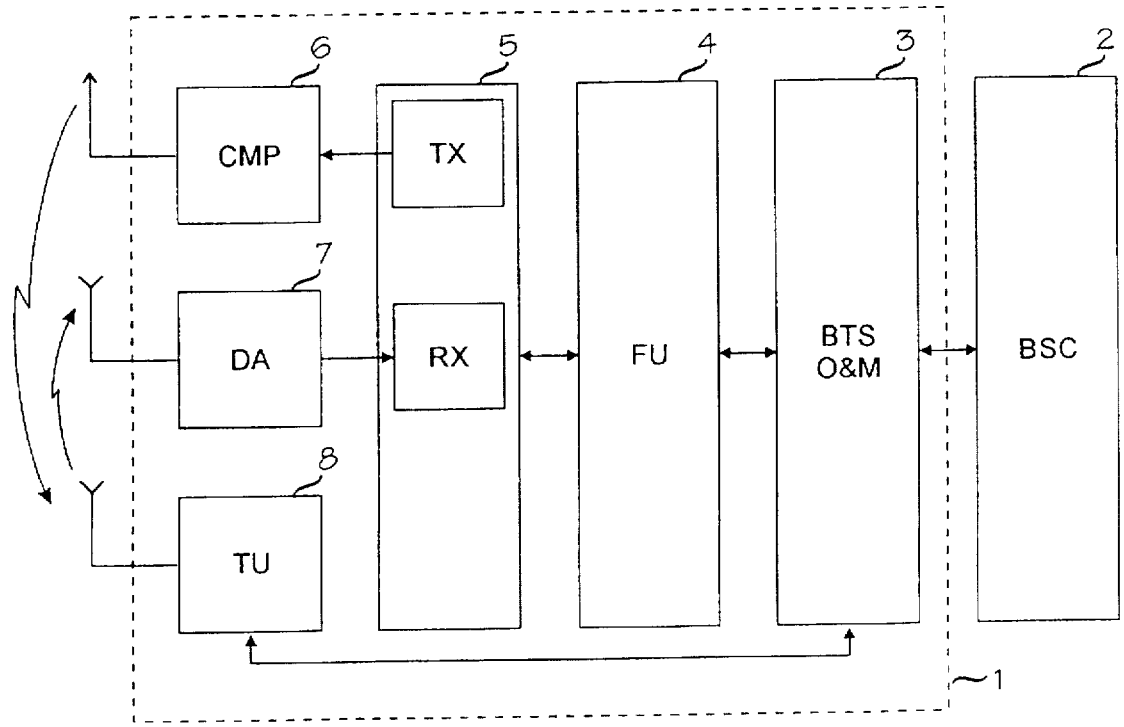
Figure 3:
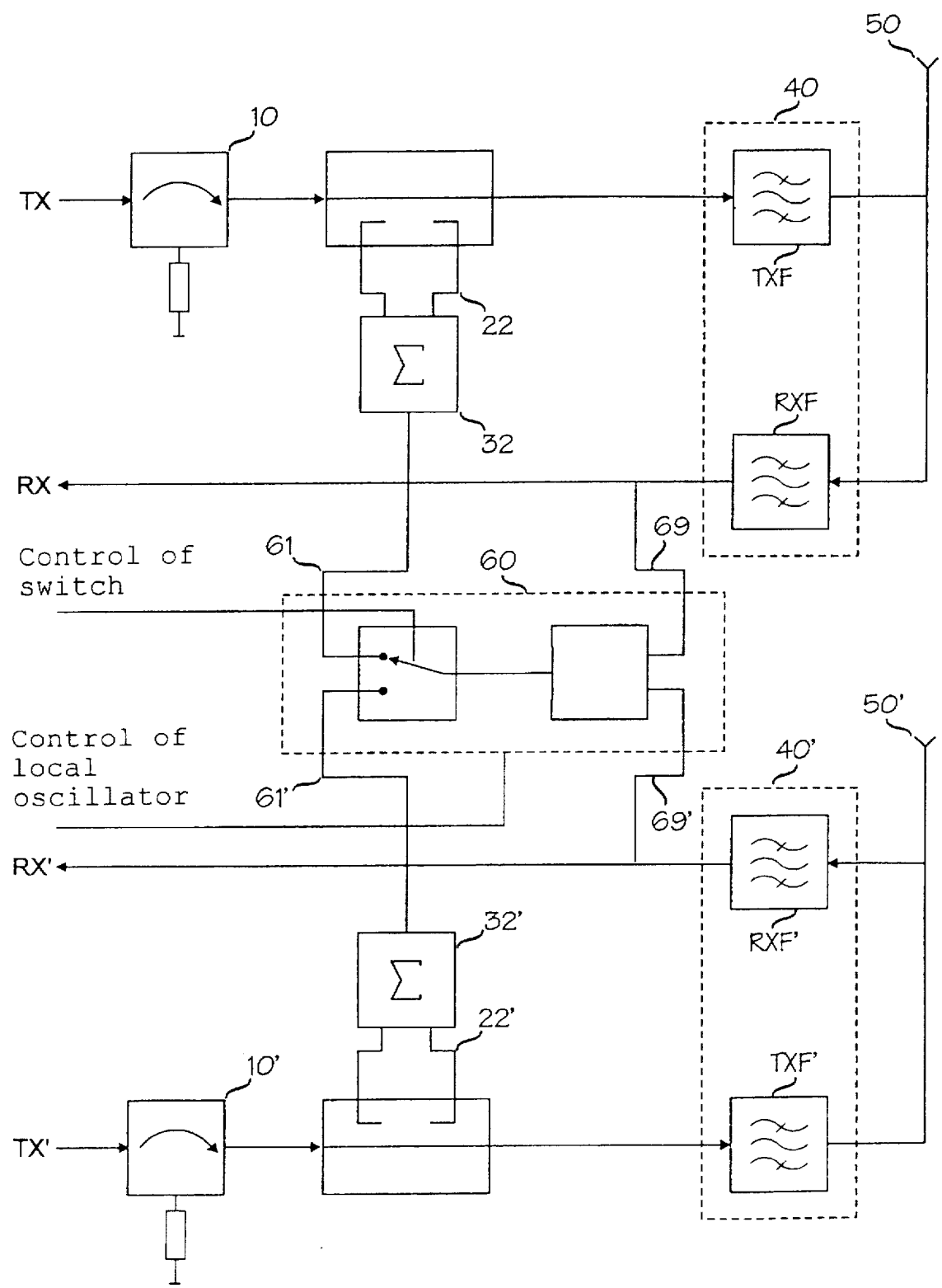
Figure 4:
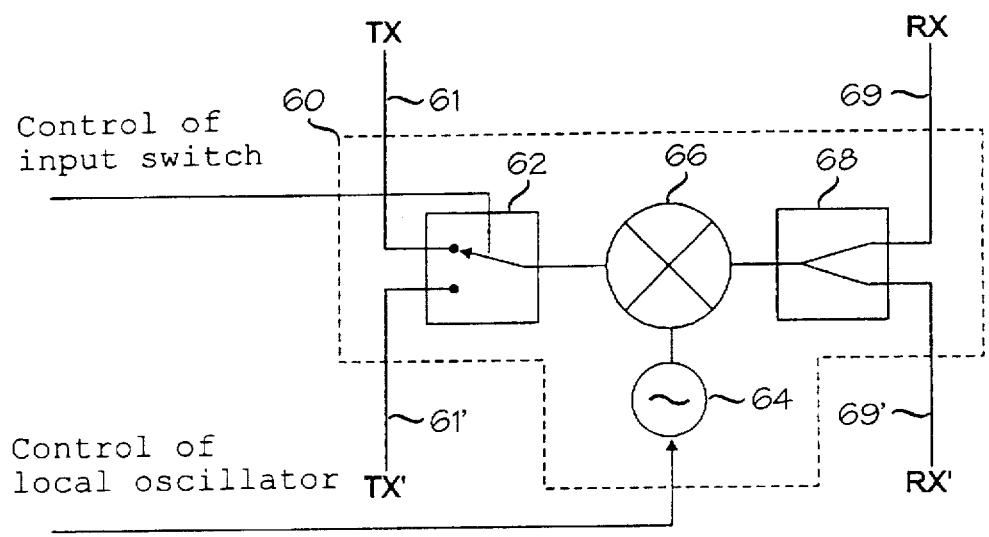
Figure 5:
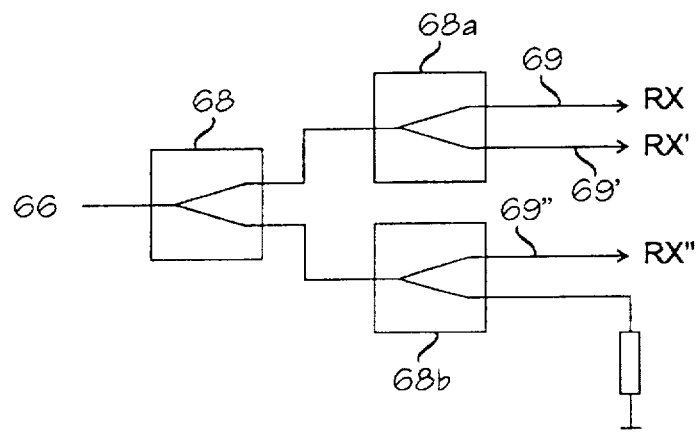
Figure 6:
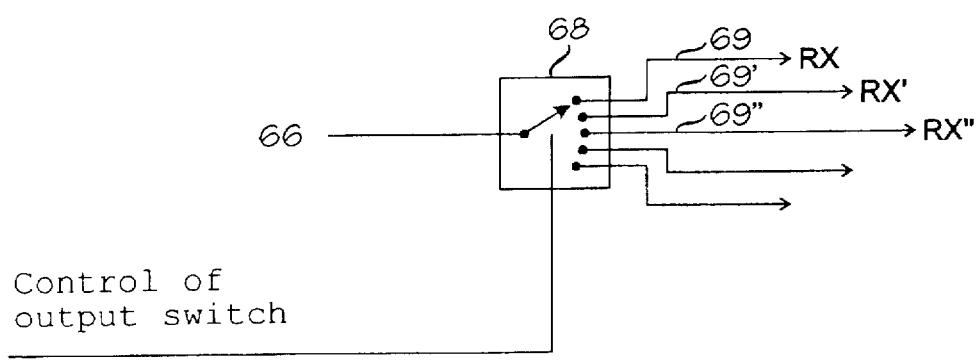

*Attesting Officer*   *Director of Patents and Trademarks*